(12) United States Patent
Ganapathy et al.

(10) Patent No.: US 11,903,091 B2
(45) Date of Patent: Feb. 13, 2024

(54) METHOD FOR EMPLOYING KEYCHAIN STORAGE IN CLIENT DEVICE TO RETRIEVE CRITICAL INFORMATION FOR REINSTALLED APPLICATIONS

(71) Applicant: ARRIS Enterprises LLC, Suwanee, GA (US)

(72) Inventors: Jalagandeswari Ganapathy, Bangalore (IN); Muralidharan Narayanan, Bangalore (IN)

(73) Assignee: ARRIS ENTERPRISES LLC, Horsham, PA (US)

(*) Notice: Subject to any disclaimer, the term of this patent is extended or adjusted under 35 U.S.C. 154(b) by 346 days.

(21) Appl. No.: 17/409,996

(22) Filed: Aug. 24, 2021

(65) Prior Publication Data

US 2022/0116765 A1 Apr. 14, 2022

Related U.S. Application Data

(60) Provisional application No. 63/091,497, filed on Oct. 14, 2020.

(51) Int. Cl.
| | | |
|---|---|---|
| *H04W 8/24* | (2009.01) | |
| *H04L 67/148* | (2022.01) | |
| *G06F 3/06* | (2006.01) | |
| *G06F 21/78* | (2013.01) | |
| *H04W 84/12* | (2009.01) | |

(52) U.S. Cl.
CPC ............ *H04W 8/24* (2013.01); *G06F 3/0604* (2013.01); *G06F 3/067* (2013.01); *G06F 3/0647* (2013.01); *H04L 67/148* (2013.01); *G06F 21/78* (2013.01); *H04W 84/12* (2013.01)

(58) Field of Classification Search
CPC ....... H04W 8/24; H04W 84/12; G06F 3/0604; G06F 3/0647; G06F 3/067
See application file for complete search history.

(56) References Cited

U.S. PATENT DOCUMENTS

2018/0225288 A1* 8/2018 Shivam .................. H04L 67/06
2021/0103481 A1* 4/2021 Bernat .................. G06F 9/5088

* cited by examiner

*Primary Examiner* — Gerald Johnson
(74) *Attorney, Agent, or Firm* — Wenderoth, Lind & Ponack, L.L.P.

(57) ABSTRACT

A system and a method are provided for a client device for use with a Wi-Fi network device, a first external server, and a second external server. The client device includes a memory having a non-critical portion configured to store non-critical data and a keychain storage portion configured to store encrypted data and a processor configured to execute instructions stored on the memory to cause the client device to: wirelessly associate with the Wi-Fi network device; store Wi-Fi network device data associated with configuring the Wi-Fi network device in the first external server; migrate the Wi-Fi network device data from the first external server to the second external server via the client device; and store migration status information in the keychain storage portion of the memory.

12 Claims, 9 Drawing Sheets

METHOD FOR EMPLOYING KEYCHAIN STORAGE IN CLIENT DEVICE TO RETRIEVE CRITICAL INFORMATION FOR REINSTALLED APPLICATIONS

BACKGROUND

Embodiments of the present disclosure generally relate to retrieving critical information for reinstalled applications.

SUMMARY

Aspects of the present disclosure are drawn to a client device for use with a Wi-Fi network device, a first external server, and a second external server. The client device includes a memory having a non-critical portion configured to store non-critical data and a keychain storage portion configured to store encrypted data and a processor configured to execute instructions stored on the memory to cause the client device to: wirelessly associate with the Wi-Fi network device; store Wi-Fi network device data associated with configuring the Wi-Fi network device in the first external server; migrate the Wi-Fi network device data from the first external server to the second external server via the client device; store migration status information in the keychain storage portion of the memory when the migration of the Wi-Fi network device data from the first external server to the second external server is complete; and wherein migration status information stored in the keychain storage portion of the memory is configured to persist through a life cycle of the client device.

In some embodiments, the processor is configured to execute instructions stored on the memory to additionally cause the client device to store the Wi-Fi network device data via the Wi-Fi network device.

In some embodiments, the processor is configured to execute instructions stored on the memory to additionally cause the client device to store intermediate migration status information in the keychain storage portion of the memory while migrating Wi-Fi network device data from the first external server to the second external server.

In some embodiments, the client device contains a graphic user interface (GUI) configured to generate a first user menu prior to completion of migration of the data from the first external server to the second external server is complete and to generate a second user menu after completion of migration of the data from the first external server to the second external server is complete.

Other aspects of the present disclosure are drawn to a method of using a client device with a Wi-Fi network device, a first external server, and a second external server, the method including: wirelessly associating, via a processor configured to execute instructions stored on a memory having a non-critical portion configured to store non-critical data and a keychain storage portion configured to store encrypted data; storing, via the processor, Wi-Fi network device data associated with configuring the Wi-Fi network device in the first external server; migrating, via the processor, the Wi-Fi network device data from the first external server to the second external server via the client device; storing, via the processor, migration status information in the keychain storage portion of the memory when the migration of the Wi-Fi network device data from the first external server to the second external server is complete; and wherein migration status information stored in the keychain storage portion of the memory is configured to persist through a life cycle of the client device.

In some embodiments, storing the Wi-Fi network device data includes storing the Wi-Fi network device data via the Wi-Fi network device.

In some embodiments, the method further includes storing, via the processor, intermediate migration status information in the keychain storage portion of the memory while migrating Wi-Fi network device data from the first external server to the second external server.

In some embodiments, the method further includes generates, via a graphic user interface (GUI), a first user menu prior to completion of migration of the data from the first external server to the second external server is complete; and generates, via the GUI, a second user menu after completion of migration of the data from the first external server to the second external server is complete.

Other aspects of the present disclosure are drawn to a non-transitory, computer-readable media having computer-readable instructions stored thereon, the computer-readable instructions being capable of being read by a client device for use with a Wi-Fi network device, a first external server, and a second external server. The computer-readable instructions are capable of instructing the client device to perform the method including: wirelessly associating, via a processor configured to execute instructions stored on a memory having a non-critical portion configured to store non-critical data and a keychain storage portion configured to store encrypted data; storing, via the processor, Wi-Fi network device data associated with configuring the Wi-Fi network device in the first external server; migrating, via the processor, the Wi-Fi network device data from the first external server to the second external server via the client device; storing, via the processor, migration status information in the keychain storage portion of the memory when the migration of the Wi-Fi network device data from the first external server to the second external server is complete; and wherein migration status information stored in the keychain storage portion of the memory is configured to persist through a life cycle of the client device.

In some embodiments, the computer-readable instructions are capable of instructing the client device to perform the method where storing the Wi-Fi network device data includes storing the Wi-Fi network device data via the Wi-Fi network device.

In some embodiments, the computer-readable instructions are capable of instructing the client device to perform the method further including storing, via the processor, intermediate migration status information in the keychain storage portion of the memory while migrating Wi-Fi network device data from the first external server to the second external server.

In some embodiments, the computer-readable instructions are capable of instructing the client device to perform the method further including: generating, via a graphic user interface (GUI), a first user menu prior to completion of migration of the data from the first external server to the second external server is complete; and generating, via the GUI, a second user menu after completion of migration of the data from the first external server to the second external server is complete.

BRIEF SUMMARY OF THE DRAWINGS

The accompanying drawings, which are incorporated in and form a part of the specification, illustrate example embodiments and, together with the description, serve to explain the principles of the present disclosure. In the drawings.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Home network controller management applications, the software programs that enable users to onboard and manage routers, access points, and client devices for wireless networks, require many different types of data to be operational. An example of the type of data that a home network controller management application may use and store are user credentials, parental control settings, and information about connected devices.

When a home network controller management application is upgraded on a client device, the user data required by the application needs to be moved or migrated from the previous version of the application to the upgraded version of the application. In addition, if an external server is used to store user data required by the application, if that external server is replaced with another server, the user data needs to be moved or migrated from the old server to the new server.

In today's world, customers expect their software applications to run smoothly and efficiently. When an application is upgraded or an external server required by the application is replaced, the migration of data to the new application or server should be almost invisible to the user. A data migration or a server migration should always take place quickly, smoothly, and with as little customer intervention as possible.

One issue that can occur with data or server migrations on Wi-Fi networks is when a home network controller manager application needs to retain information in its memory about the status of the data or server migration in order to function properly. Either the application needs to retain information about the status of a data migration in order to show the user the correct GUI in the client device display, or the application needs to retain information about the status of a server migration to associate the client device with the correct server. If the information about the data or server migration is retained in the application's cache and if the user of the client device deletes the application, the information in the application's cache is deleted as well. Then, when the user reinstalls the application, the user must go through a process of reimporting their user data, reinitializing their application, and re-associating their application with the correct server in order for the application to function properly again. This issue can cause stress and confusion for a user. This will now be described in greater detail with reference to FIGS. 1-2.

Figure 1:
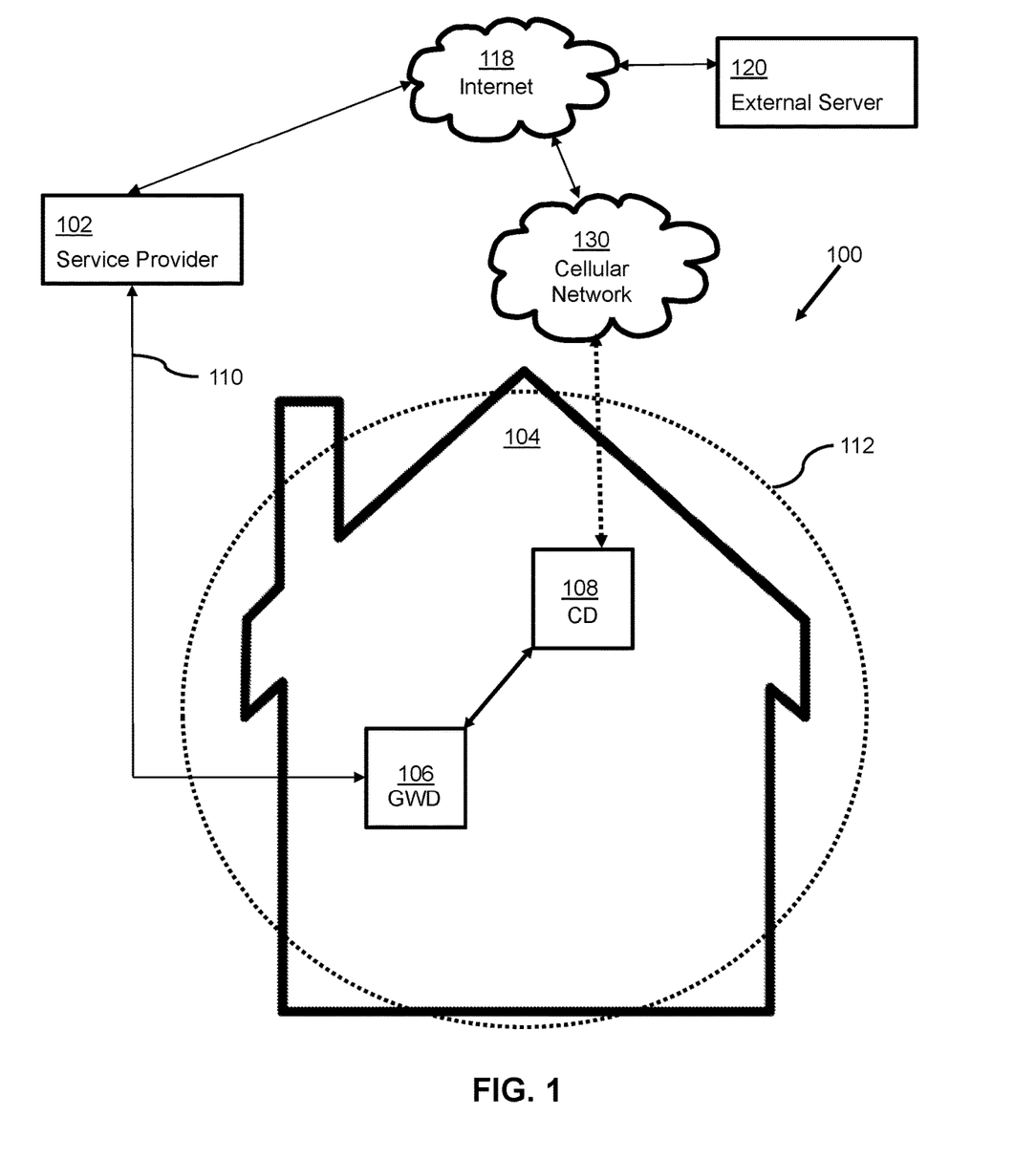
FIG. 1 illustrates structural components implementing an electronic communication network.

FIG. 1 illustrates structural components implementing an electronic communication network 100. As shown in FIG. 1, network 100 includes a residence 104, a service provider 102, physical/media wiring 110, Internet 118, a cellular network 130, and an external server 120. Residence 104 contains a gateway device 106, a client device 108, and a wireless local area network (WLAN) 112. Gateway device 106 is arranged to communicate with service provider 102 by way of physical/media wiring 110.

A gateway device 106, also referred to as a gateway, residential gateway, or RG, is an electronic device that is to be located so as to establish a local area network (LAN) at a consumer premises. The consumer premises can include a residential dwelling, office, or any other business space of a user. The terms home, office, and premises may be used synonymously herein.

Gateway device 106 may be any device or system that is operable to allow data to flow from one discrete network to another, which in this example is from WLAN 112 in FIG. 1 to an external network, e.g., Internet 118 or cellular network 130 by way of Internet 118. Gateway device 106 may perform such functions as web acceleration and HTTP compression, flow control, encryption, redundancy switchovers, traffic restriction policy enforcement, data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing.

Gateway device 106 establishes, or is part of, WLAN 112, using Wi-Fi for example, such that client device 108 is able to communicate wirelessly with gateway device 106. In particular, gateway device 106 is able to communicate wirelessly directly with client device 108. The term Wi-Fi as used herein may be considered to refer to any of Wi-Fi 4, 5, 6, 6E, or any variation thereof.

Further, it should be noted that gateway device 106 is able to communicate with service provider 102 via physical media/wiring 110, which may optionally be a wireless communication system, such as 4G, or 5G, and further is able to connect to Internet 118 or another external network (not shown) via service provider 102.

Further, it should be noted that gateway device 106 is able to communicate with external server 120 and cellular network 130 by way of Internet 118.

Service provider 102 includes head-end equipment such as server computers (e.g., automatic configuration server ACS, cable modem termination system CMTS) that enable a content provider, such as a cable television provider, a satellite television provider, an internet service provider, or multiple-systems operator (MSO), to provide content (such as audio/video content and/or internet service) either through physical media/wiring 110, such as a coaxial network, an optical fiber network, and/or DSL, or wireless network 112, such as a satellite or terrestrial antenna implemented network or a combination of any of these examples or their equivalents. The data communicated on such network can be implemented using a variety of protocols on a network such as a wide area network (WAN), a virtual private network (VPN), metropolitan area networks (MANs), system area networks (SANs), a DOCSIS network, a fiber optics network (e.g., FTTH (fiber to the home), FTTX (fiber to the X), or hybrid fiber-coaxial (HFC)), a digital subscriber line (DSL), a public switched data network (PSDN), a global Telex network, or a 2G, 3G, 4G or 5G, for example.

Gateway device 106 serves as a gateway or access point to Internet 118 (or otherwise as mentioned above) for one or more electronic devices, referred to generally herein as client device 108, that wirelessly communicate with gateway device 106 via, e.g., Wi-Fi. Client device 108 can be a desktop computer, laptop computer, electronic tablet device, smart phone, appliance, or any other so-called internet of things equipped device that is equipped to communicate information via WLAN 112.

Within WLAN 112, electronic devices are often referred to as being stations in WLAN 112. In IEEE 802.11 (Wi-Fi) terminology, a station (abbreviated as STA) is a device that has the capability to use the 802.11 protocol. For example, a station may be a laptop, a desktop PC, PDA, access point or Wi-Fi phone. An STA may be fixed, mobile or portable. Generally, in wireless networking terminology, a station, wireless client, and node are often used interchangeably, with no strict distinction existing between these terms. A station may also be referred to as a transmitter or receiver based on its transmission characteristics. IEEE 802.11-2012 defines station as: a logical entity that is a singly addressable instance of a medium access control (MAC) and physical layer (PHY) interface to the wireless medium (WM).

A wireless access point (WAP), or more generally just access point (AP), is a networking hardware device that allows other Wi-Fi devices to connect to a Wi-Fi network. A service set ID (SSID) is an identification (in IEEE 802.11) that is broadcast by access points in beacon packets to announce the presence of a network access point for the SSID. SSIDs are customizable IDs that can be zero to 32 bytes, and can be in a natural language, such as English. In WLAN 112, gateway device 106 is an access point for WLAN 112.

FIGS. 2A-F illustrate example graphic user interfaces (GUIs) on client device 108 of FIG. 1 at times $t_1$, $t_2$, $t_3$, $t_4$, $t_5$, and $t_6$, respectively. The GUIs shown are examples of the type of messages that a user would see when upgrading a home network controller management application to a new version of the application and migrating their data to the upgraded application on client device 108. For purposes of discussion, assume that data migration takes place from external server 120 of FIG. 1, to the application cache of the home network controller management application on client device 108.

Figure 2A:
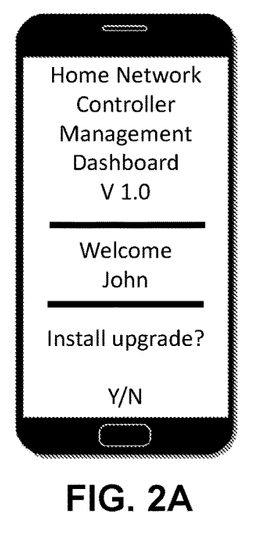
FIG. 2A illustrates a graphic user interface (GUI) on a client device at a time $t_1$.

FIG. 2A is an example of what the user would see on the GUI of client device 108 at time $t_1$ when it is time to upgrade the application. As shown in the figure, the user would see a message with an option to upgrade their application. For purposes of discussion, assume that the user of client device 108 selects Y (for yes) to upgrade their application.

Figure 2B:
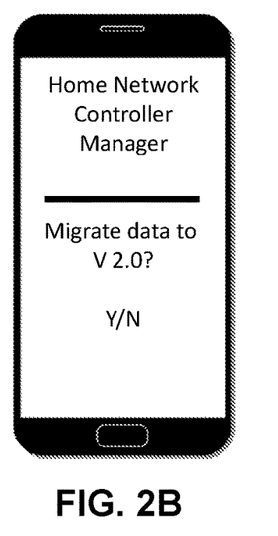
FIG. 2B illustrates the GUI on the client device of FIG. 2A at a time $t_2$.

FIG. 2B is an example of what the user would see on the GUI of client device 108 at a time $t_2$, which is after the application has been upgraded in client device 108, but before the user's data has been migrated to client device 108. In FIG. 2B, the user is presented with an option to migrate their data into the upgraded application. For purposes of discussion, assume that the user of client device 108 selects Y to migrate their data. Also assume for purposes of discussion that a copy of the user's data is on external server 120.

Figure 2C:
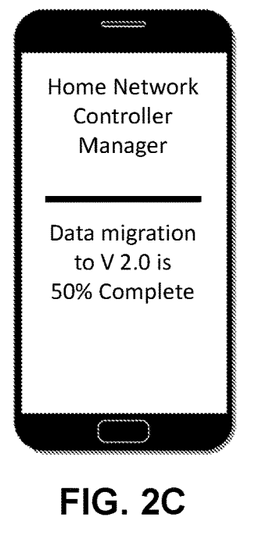
FIG. 2C illustrates the GUI on the client device of FIG. 2A at a time $t_3$.

FIG. 2C is an example of what the user would see on the GUI of client device 108 at time $t_3$ after 50% of the user's data has been migrated to the upgraded application. As shown in FIG. 2C, the data migration status is shown to the user in the GUI of client device 108.

Figure 2D:
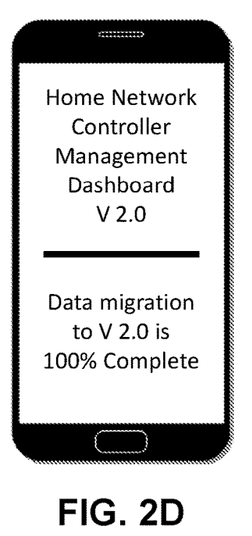
FIG. 2D illustrates the GUI on the client device of FIG. 2A at a time $t_4$.

FIG. 2D is an example of what the user would see on the GUI of client device 108 at time $t_4$ after 100% of the user's data has been migrated to the upgraded application. As shown in FIG. 2D, the data migration status is shown to the user in the GUI of client device 108.

Figure 2E:
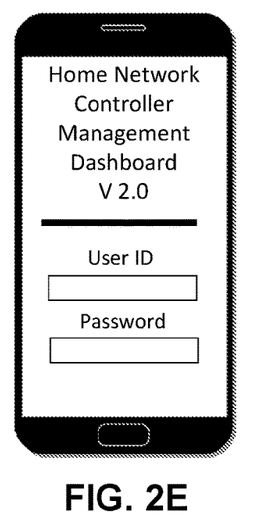
FIG. 2E illustrates the GUI on the client device of FIG. 2A at a time $t_5$.

For purposes of discussion, assume that after time $t_4$, the data migration to the upgraded application is complete and the user decides to delete and then reinstall the upgraded application on client device 108. FIG. 2E is an example of what the user would see on the GUI of client device 108 at time $t_5$ after the upgraded application on client device 108 has been reinstalled. As illustrated in FIG. 2E, after reinstalling the application, the user would be prompted to log back into the application because when the application was deleted from client device 108, the application cache, which contained the user's id and password, was also deleted. Therefore, the user has to reenter their user id and password to log back into the application.

Figure 2F:
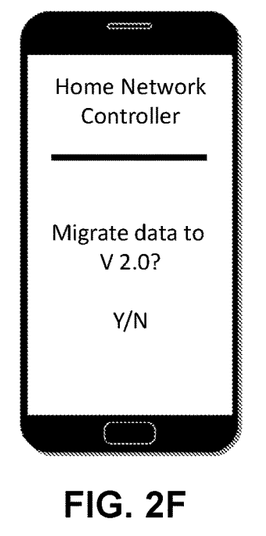
FIG. 2F illustrates the GUI on the client device of FIG. 2A at a time $t_6$.

FIG. 2F is an example of what the user would see on the GUI of client device 108 at a time $t_6$ after logging back into the application. As can be seen in FIG. 2F, even though the data migration from the old application to the new application on client device 108 was completed earlier at time $t_4$, now, at time $t_6$, after reinstallation, the new application on client device 108 is not aware that the data migration was completed because the database containing the user's data, which was in the application cache, was deleted when the home network controller management application was deleted as described previously. As a result, the user would see the message as illustrated in FIG. 2F asking them to migrate their data to the reinstalled application.

This would cause a frustrating customer experience for the user of client device 108 because the user had already migrated their data, and at time $t_6$ the user is being asked to repeat the process of data migration.

What is needed is a system and a method to retain application-specific initialization information in a client device, even after the application has been deleted and reinstalled, so that the application can be quickly reinitialized with the user's data.

A system and a method in accordance with the present disclosure solves the problem of the need to retain application-specific initialization information in a client device when an application is deleted and then later reinstalled.

In accordance with the present disclosure, the home network controller management application stores application-specific initialization data, such as data migration status and server migration status, in the keychain storage area of an associated client device. The keychain storage is persistent and information in the keychain does not get deleted even if the application gets deleted.

A system and method in accordance with the present disclosure improves the user experience because by using the keychain to store application-specific initialization data, if the home network controller management application is deleted and then reinstalled, the client device will be able to reinitialize the reinstalled application quickly with the user's data, thus making it easy for a user to begin using their application again.

An example system and method for using the keychain storage area in a client device to retain application-specific initialization information and using it to reinitialize a home network controller management application will now be described in greater detail with reference to FIGS. 3-9.

Figure 3:
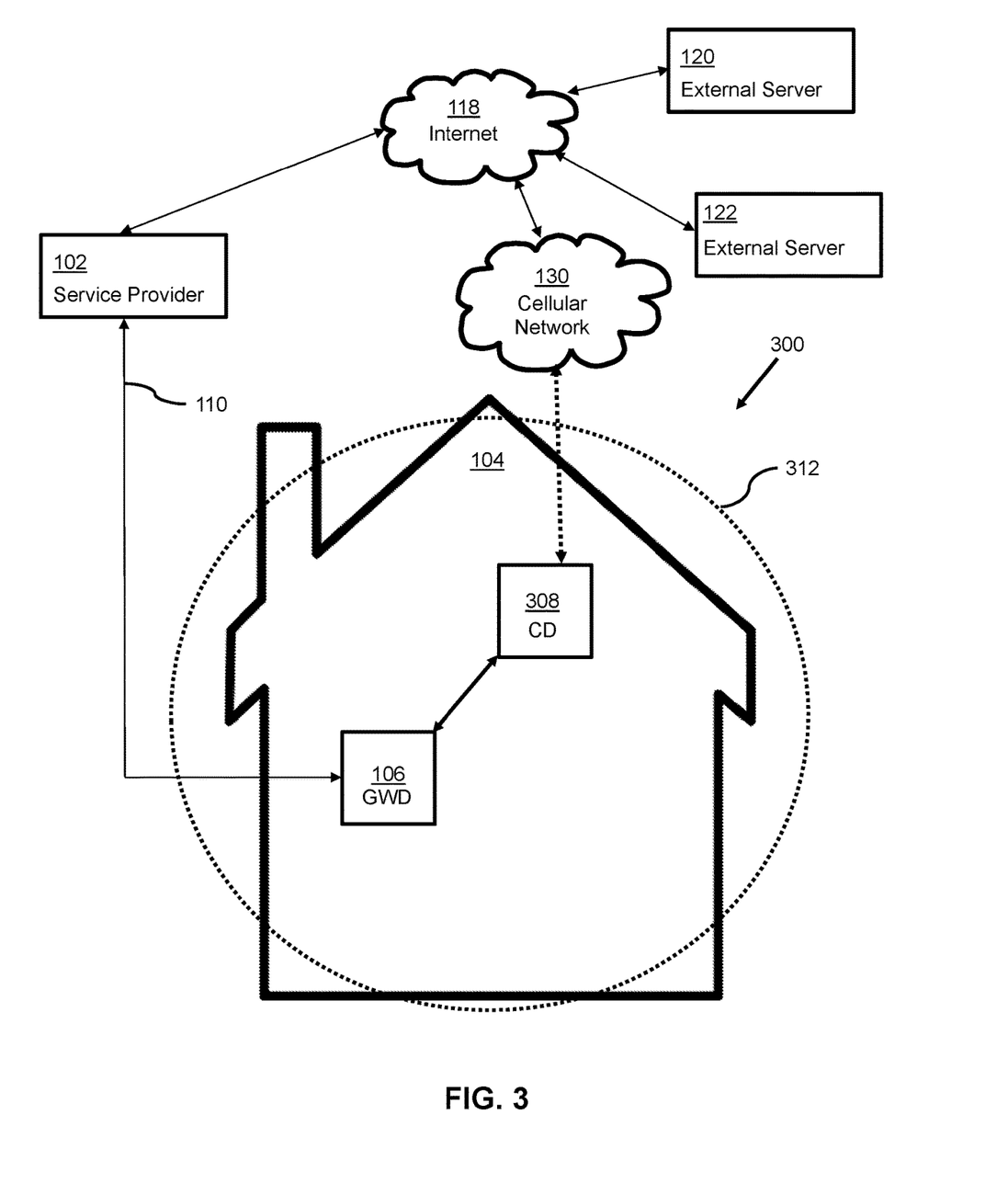
FIG. 3 illustrates structural components implementing an electronic communication network in accordance with aspects of the present disclosure.

FIG. 3 illustrates structural components implementing an electronic communication network 300 in accordance with aspects of the present disclosure. As shown in FIG. 3, network 300 includes residence 104, service provider 102, physical/media wiring 110, Internet 118, cellular network 130, external server 120, and an external server 122. Residence 104 contains gateway device 106, a client device 308, and a wireless local area network (WLAN) 312.

Gateway device 106 establishes, or is part of, WLAN 312, using Wi-Fi for example, such that client device 308 is able to communicate wirelessly with gateway device 106. In particular, gateway device 106 is able to communicate wirelessly directly with client device 308.

Further, it should be noted that gateway device 106 is able to communicate with service provider 102 via physical media/wiring 110, which may optionally be a wireless communication system, such as 4G, or 5G, and further is able to connect to Internet 118 via service provider 102.

Further, it should be noted that gateway device 106 is able to communicate with external server 120, external server 122, and cellular network 130 by way of Internet 118.

Figure 4:
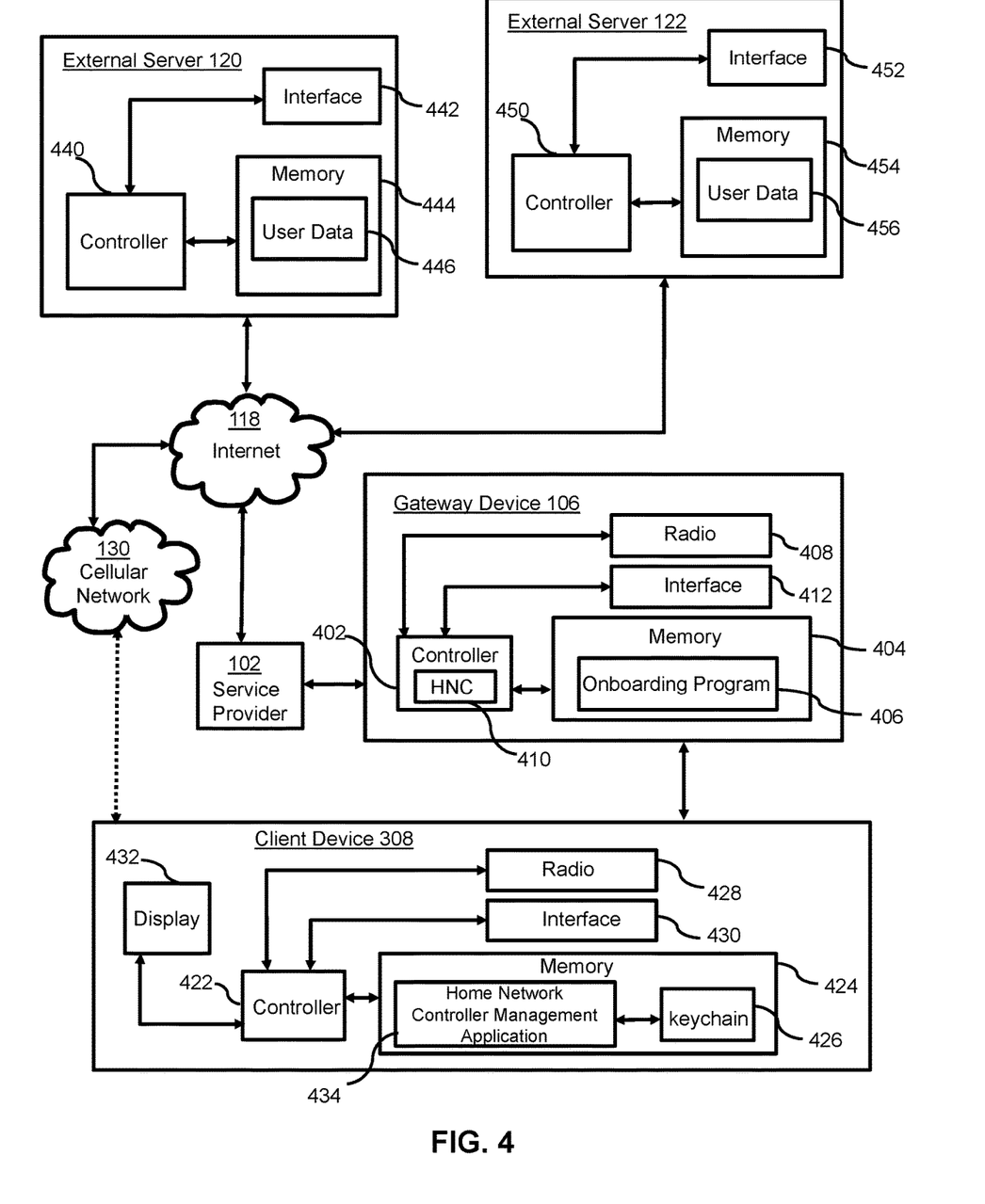
FIG. 4 illustrates an exploded view of a gateway device, a client device, and two external servers in accordance with aspects of the present disclosure.

FIG. 4 illustrates an exploded view of gateway device 106, client device 308, external server 120 and external server 122 of FIG. 3.

As shown in FIG. 4, gateway device 106 includes: a controller 402, which has stored therein a home network controller (HNC) 410; a memory 404, which has stored therein an onboarding program 406; at least one radio, a sample of which is illustrated as a radio 408; and an interface circuit 412.

In this example, controller 402, memory 404, radio 408, and interface circuit 412 are illustrated as individual devices. However, in some embodiments, at least two of controller 402, memory 404, radio 408, and interface circuit 412 may be combined as a unitary device. Whether as individual devices or as combined devices, controller 402, memory 404, radio 408, and interface circuit 412 may be implemented as any combination of an apparatus, a system and an integrated circuit. Further, in some embodiments, at least one of controller 402, memory 404 and interface circuit 412 may be implemented as a computer having non-transitory computer-readable media for carrying or having computer-executable instructions or data structures stored thereon. Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from, and write information to the tangible computer-readable media. In the alternative, the tangible computer-readable media may be integral to the processor. The processor and the tangible computer-readable media may reside in an integrated circuit (IC), an application specific integrated circuit (ASIC), or large-scale integrated circuit (LSI), system LSI, super LSI, or ultra LSI components that perform a part or all of the functions described herein. In the alternative, the processor and the tangible computer-readable media may reside as discrete components.

Example tangible computer-readable media may be also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

Controller 402 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of the gateway device 106 in accordance with the embodiments described in the present disclosure.

Memory 404 can store various programming, and user content, and data including onboarding program 406. Onboarding program 406 includes instructions, that when executed by HNC 410, enables HNC 410 to manage onboarding of network devices and client device 308.

Interface circuit 412 can include one or more connectors, such as RF connectors, or Ethernet connectors, and/or wireless communication circuitry, such as 5G circuitry and one or more antennas. Interface circuit 412 receives content from service provider 102 by known methods, non-limiting examples of which include terrestrial antenna, satellite dish, wired cable, DSL, optical fibers, or 5G as discussed above. Through interface circuit 412, gateway device 106 receives an input signal, including data and/or audio/video content, from service provider 102 and can send data to service provider 102.

Radio 408, (and preferably two or more radios), may also be referred to as a wireless communication circuit, such as a Wi-Fi WLAN interface radio transceiver and is operable to communicate with client device 308. Radio 408 includes one or more antennas and communicates wirelessly via one or more of the 2.4 GHz band, the 5 GHz band, the 6 GHz band, and the 60 GHz band, or at the appropriate band and bandwidth to implement any IEEE 802.11 Wi-Fi protocols, such as the Wi-Fi 4, 5, 6, or 6E protocols. Gateway device 106 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands, RF4CE protocol, ZigBee protocol, Z-Wave protocol, or IEEE 802.15.4 protocol.

External server 120 includes: a controller 440; a memory 444, which has stored therein user data 446; and an interface circuit 442.

In this example, controller 440 and memory 444 are illustrated as individual devices. However, in some embodiments, at least two of controller 440 and memory 444 may be combined as a unitary device. Further, in some embodiments, at least one of controller 440 and memory 444 may be implemented as a computer having tangible computer-readable media for carrying or having computer-executable instructions or data structures stored thereon.

Controller 440 may be implemented as hardware circuitry such as a dedicated control circuit, CPU, a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of the external server 120 in accordance with the embodiments described in the present disclosure.

Memory 444 can store various programming, and user content, and data including user data 446.

External server 122 includes: a controller 450; a memory 454, which has stored therein user data 456; and an interface circuit 452.

In this example, controller 450 and memory 454 are illustrated as individual devices. However, in some embodiments, at least two of controller 450 and memory 454 may be combined as a unitary device. Further, in some embodiments, at least one of controller 450 and memory 454 may be implemented as a computer having tangible computer-readable media for carrying or having computer-executable instructions or data structures stored thereon.

Controller 450 may be implemented as hardware circuitry such as a dedicated control circuit, CPU, a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of the external server 122 in accordance with the embodiments described in the present disclosure.

Memory 454 can store various programming, and user content, and data including user data 456.

Client device 308 includes: a controller 422; a memory 424, which has stored therein a home network controller management application 434 and a keychain 426; and at least one radio, a sample of which is illustrated as a radio 428; an interface circuit 430 and a display 432.

In this example, controller 422, memory 424, radio 428, interface circuit 430 and display 432 are illustrated as individual devices. However, in some embodiments, at least two of controller 422, memory 424, radio 428, interface circuit 430 and display 432 may be combined as a unitary device. Further, in some embodiments, at least one of controller 422 and memory 424 may be implemented as a computer having tangible computer-readable media for carrying or having computer-executable instructions or data structures stored thereon.

Controller 422 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of client device 308 in accordance with the embodiments described in the present disclosure.

Memory 424 can store various programming, and user content, and data including home network controller management application 434 and keychain 426.

Radio 428, may include a Wi-Fi WLAN interface radio transceiver that is operable to communicate with gateway device 106 and also may include a cellular transceiver operable to communicate with cellular network 130. Radio 428 includes one or more antennas and communicates wirelessly via one or more of the 2.4 GHz band, the 5 GHz band, the 6 GHz band, and the 60 GHz band, or at the appropriate band and bandwidth to implement any IEEE 802.11 Wi-Fi protocols, such as the Wi-Fi 4, 5, 6, or 6E protocols. Client device 308 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands or 60 GHz bands, RF4CE protocol, ZigBee protocol, Z-Wave protocol, or IEEE 802.15.4 protocol.

Insofar as gateway device 106 provides connection to service provider 102, such as an MSO, gateway device 106 can be equipped with connectors to connect with a television or display device, and can also include programming to execute an electronic program guide and/or other suitable graphic user interface (GUI), and can with such configuration be referred to as a so called set top box. Such a set top box can be included in the system shown in FIG. 4 as gateway device 106 or in addition thereto. Moreover, inclusion of one or more of far-field microphones, (for e.g., voice command and/or presence recognition, and/or telephone communication), cameras, (for e.g., gesture and/or presence recognition, and/or video telephone communication), and speakers, and associated programming, can enable the gateway device to be a so-called smart media device.

As will be described in more detail below, controller 422 is configured to execute instructions stored on memory 424 to cause client device 308 to: wirelessly associate with gateway device 106; store Wi-Fi network device data associated with configuring gateway device 106 in external server 120; migrate the Wi-Fi network device data from external server 120 to external server 122 via client device 308; store migration status information in the keychain storage portion of memory 424 when the migration of the Wi-Fi network device data from external server 120 to external server 122 is complete; and wherein migration status information stored in the keychain storage portion of memory 424 is configured to persist through a life cycle of client device 308.

As will be described in more detail below, controller 422 is configured to execute instructions stored on memory 424 to additionally cause client device 308 to store the Wi-Fi network device data via gateway device 106.

As will be described in more detail below, controller 422 is configured to execute instructions stored on memory 424 to additionally cause client device 308 to store intermediate migration status information in the keychain storage portion of memory 424 while migrating Wi-Fi network device data from external server 120 to external server 122. Non-limiting examples of intermediate migration status information includes timestamp information related to a start of the migration from external server 120 to external server 122, and user account information as provided to external server 120 and external server 122.

Figure 5:
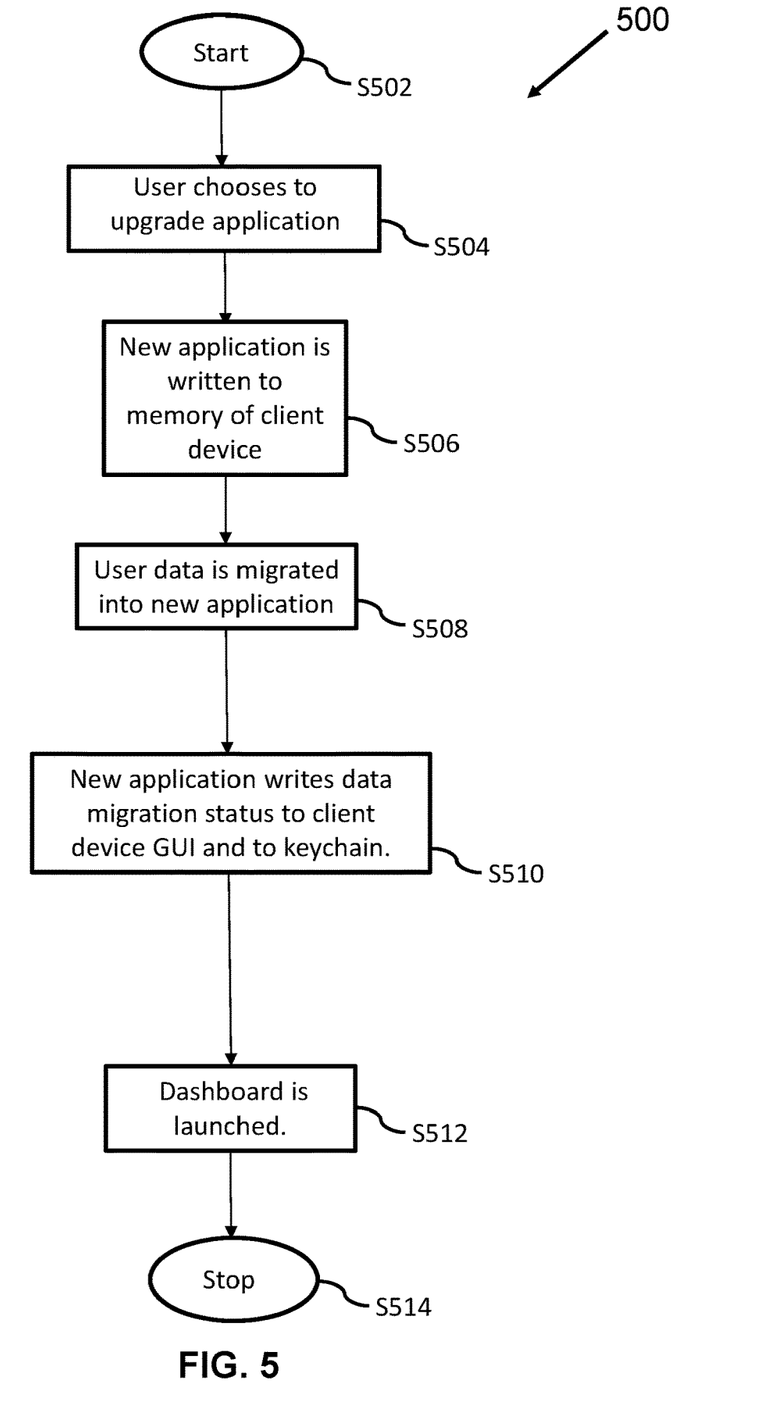
FIG. 5 illustrates an example algorithm in which a home network controller management application is upgraded on a client device and user data is migrated to the upgraded version of the application and initialization information is saved to the keychain memory in the client device in accordance with aspects of the present disclosure.

FIG. 5 illustrates an example algorithm 500 in which a home network controller management application is upgraded on a client device and user data is migrated to the upgraded version of the application and initialization information for the application is saved to the keychain memory in the client device in accordance with aspects of the present disclosure. This will now be described in more detail with reference to FIGS. 3-4, and FIGS. 6A-E.

FIGS. 6A-E illustrate example graphic user interfaces on client device 308 of FIGS. 3 and 4 at five different times respectively during which the home network controller management application on client device 308 is being upgraded from version 1 to version 2 and the user data is being migrated from version 1 to version 2.

Figure 6A:
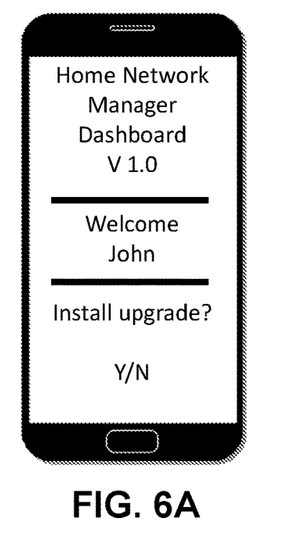
FIG. 6A illustrates the GUI on a client device at a time $t_{10}$ in accordance with aspects of the present disclosure.
Figure 6B:
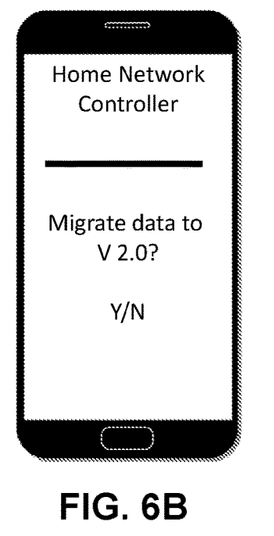
FIG. 6B illustrates the GUI on the client device of FIG. 6A at a time $t_{11}$.
Figure 6C:
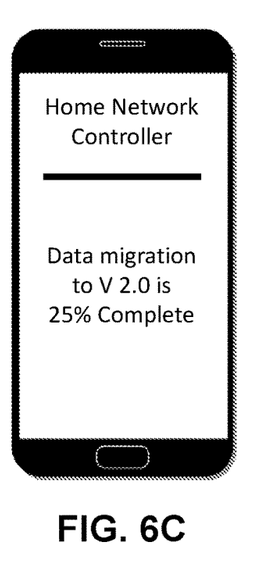
FIG. 6C illustrates the GUI on the client device of FIG. 6A at a time $t_{12}$.
Figure 6D:
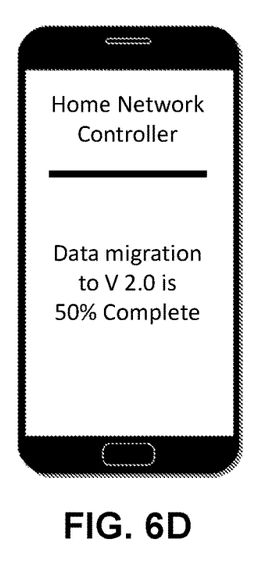
FIG. 6D illustrates the GUI on the client device of FIG. 6A at a time $t_{13}$.
Figure 6E:
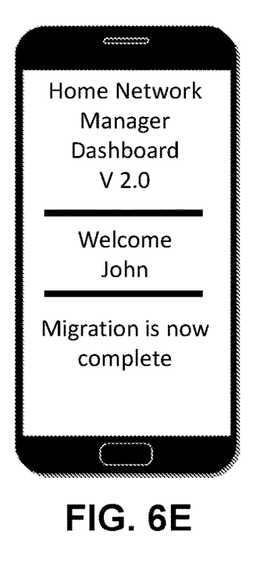
FIG. 6E illustrates the GUI on the client device of FIG. 6A at a time $t_{14}$.

The graphic user interface on client device 308 is illustrated at time $t_{10}$ in FIG. 6A, at time $t_{11}$ in FIG. 6B, at time $t_{12}$ in FIG. 6C, at time $t_{13}$ in FIG. 6D, and at time $t_{14}$ in FIG. 6E.

Returning to FIG. 5, algorithm 500 to be executed by a processor starts (S502), and the user of a client device chooses to upgrade an application (S504). For example, returning to FIG. 4, the user of client device 308 chooses to upgrade home network controller management application 434. For example, returning to FIG. 6A, at time $t_{10}$, the user of client device 308 receives a message asking if they would like to upgrade their home network controller management application to a new version. For purposes of discussion, assume that the user selects Y to upgrade their application.

Returning to FIG. 5, after the user of a client device chooses to upgrade an application (S504), the new application is written to the memory of the client device (S506). For example, returning to FIG. 4, after the user of client device 308 chooses to upgrade home network controller management application 434, the new version of home network controller management application 434 is written to memory 424 of client device 308.

Returning to FIG. 5, after the new application is written to the memory of the client device (S506), the user data is migrated into the new application (S508). For example, returning to FIG. 4, after the user of client device 308 chooses to upgrade home network controller management application 434, user data 446 from external server 120 is migrated into home network controller management application 434. For example, returning to FIG. 6B, at time the user of client device 308 would see a message prompting them to migrate their data to the new version of the home network controller management application. For purposes of discussion, assume that the user selects Y to migrate their data.

Returning to FIG. 4, in some embodiments, migrating user data 446 from external server 120 into home network controller management application 434 could take place via Internet 118 and cellular network 130 or it could take place via Internet 118, service provider 102, and gateway device 106.

Returning to FIG. 5, after the user data is migrated into the new application (S508), the new application writes the data migration status to the client device GUI and to the keychain storage (S510). For example, returning to FIG. 4, after user data 446 from external server 120 is migrated into home network controller management application 434, home network controller management program 434 writes the data migration status to display 432 of client device 308 and to keychain 426 of client device 308.

For example, returning to FIG. 6C at time $t_{12}$ and FIG. 6D at time $t_{13}$, the user would see a message in the GUI of their client device letting them know the status of the data migration within their client device. The example status messages shown in FIGS. 6C-D are for illustration purposes only.

Returning to FIG. 5, after the new application writes the data migration status to the client device GUI and to the keychain storage (S510), the application dashboard is launched (S512). For example, returning to FIG. 4, after home network controller management program 434 writes the data migration status to display 432 of client device 308 and to keychain 426 of client device 308, the dashboard of home network controller management program 434 is launched in display 432.

For example, returning to FIG. 6E, at time $t_{14}$, the user of client device 308 would see the dashboard of their home network controller management application and would see that their data migration was complete.

Returning to FIG. 5, after the dashboard is launched (S512), algorithm 500 ends (S514). For example, returning to FIG. 4, after the dashboard of home network controller management program 434 is launched in display 432, the algorithm ends.

Figure 7:
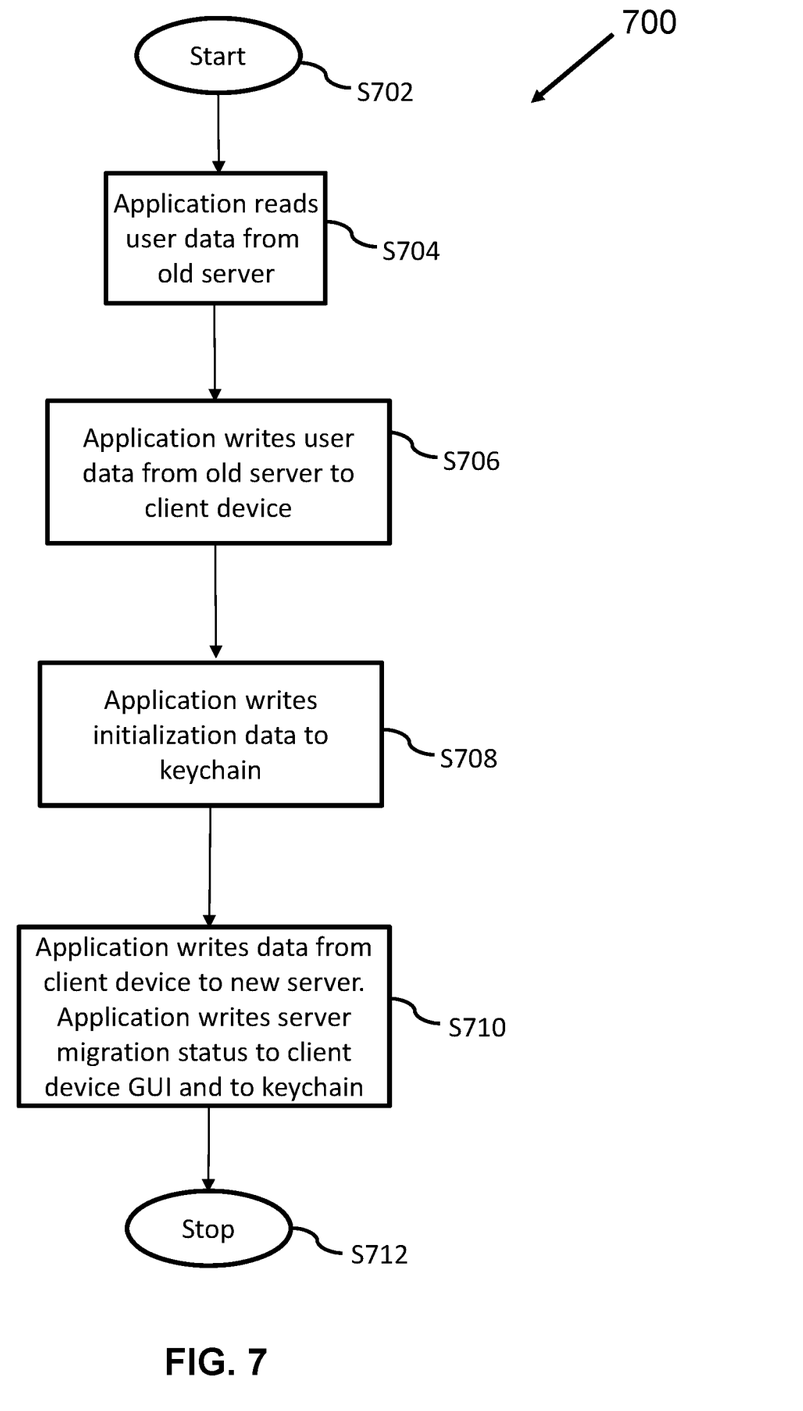
FIG. 7 illustrates an example algorithm in which user data is migrated from one server to another server and initialization information is saved to the keychain memory in the client device in accordance with aspects of the present disclosure.

FIG. 7 illustrates an example algorithm 700 in which user data is migrated from one server to another server and initialization information is saved to the keychain memory in the client device in accordance with aspects of the present disclosure. This will now be described in more detail with reference to FIGS. 3-4, and FIGS. 8A-E.

FIGS. 8A-E illustrate example graphic user interfaces on client device 308 of FIGS. 3 and 4 at five different times respectively during which the user data for the home network controller management application on client device 308 is being migrated from external server 120 to external server 122.

Figure 8A:
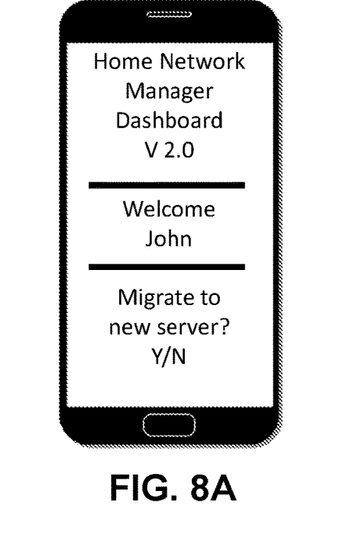
FIG. 8A illustrates the GUI on a client device at a time $t_{20}$ in accordance with aspects of the present disclosure.
Figure 8B:
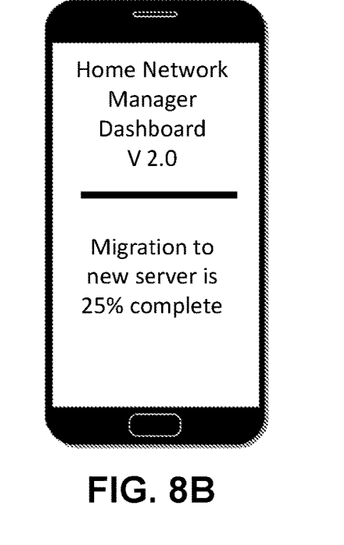
FIG. 8B illustrates the GUI on the client device of FIG. 8A at a time $t_{21}$.
Figure 8C:
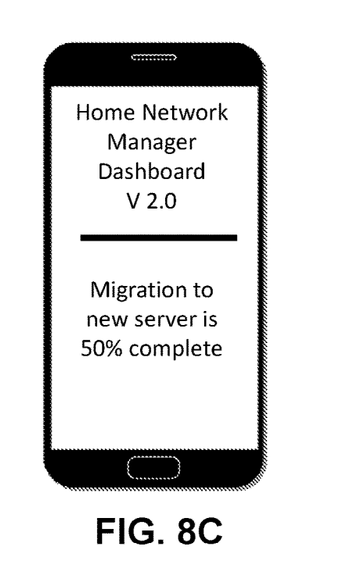
FIG. 8C illustrates the GUI on the client device of FIG. 8A at a time $t_{22}$.
Figure 8D:
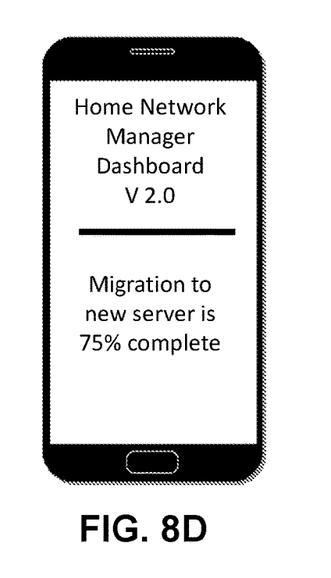
FIG. 8D illustrates the GUI on the client device of FIG. 8A at a time $t_{23}$.
Figure 8E:
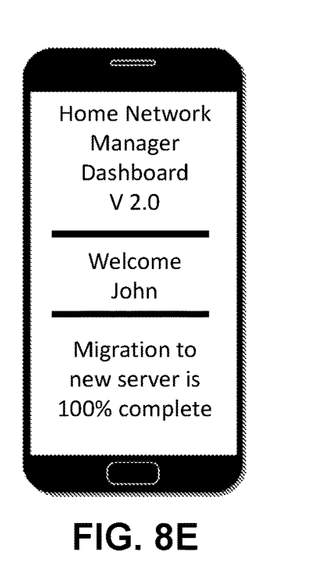
FIG. 8E illustrates the GUI on the client device of FIG. 8A at a time $t_{24}$.

The graphic user interface on client device 308 is illustrated at time $t_{20}$ in FIG. 8A, at time $t_{21}$ in FIG. 8B, at time $t_{22}$ in FIG. 8C, at time $t_{23}$ in FIG. 8D, and at time $t_{24}$ in FIG. 8E.

Returning to FIG. 7, algorithm 700 to be executed by a processor starts (S702), and the application reads data from the old server (S704). For example, returning to FIG. 4, the server migration starts, and home network controller management application 434 reads user data 446 from memory 444 in external server 120. For example, returning to FIG. 8A, at time $t_{20}$, the user of client device 308 would see a message asking them if they want to migrate their data to the new server. For purposes of discussion, assume that the user selects Y.

In some embodiments, home network controller management application 434 could read user data 446 from memory 444 in external server 120 via gateway device 106, service provider 102 and Internet 118. In other embodiments, home network controller management application 434 could read user data 446 from memory 444 in external server 120 by way of cellular network 130 and Internet 118.

Returning to FIG. 7, after the application reads the user data from the old server (S704), the application writes the user data from the old server to the client device (S706). For example, returning to FIG. 4, after home network controller management application 434 reads user data 446 from memory 444 in external server 120, home network controller management application 434 writes user data 446 to memory 424 of client device 308.

Returning to FIG. 7, after the application writes data from the old server to the client device (S706), the application writes initialization data to the keychain storage (S708). For example, returning to FIG. 4, after home network controller management application 434 writes user data 446 to memory 424 of client device 308, home network controller management application 434 writes initialization data to keychain 426 in memory 424 of client device 308.

Returning to FIG. 7, after the application writes initialization data to the keychain storage (S708), the application writes data from the client device to the new server. Additionally, the application writes server migration status information to the client device GUI and to the keychain (S710). For example, returning to FIG. 4, after home network controller management application 434 writes initialization data to keychain 426 in memory 424 of client device 308, home network controller management application 434 writes user data from client device 308 to user data 456 in external server 122. Additionally, home network controller management application 434 writes server migration status information to display 432 of client device 308 and to keychain 426 of memory 424 of client device 308.

For example, returning to FIG. 8B at time $t_{21}$ and FIG. 8C at time $t_{22}$ and FIG. 8D at time $t_{23}$, the user would see a message in the GUI of client device 308 letting them know the status of the server migration. The example status messages shown in FIGS. 8B-D are for illustration purposes only.

Returning to FIG. 7, after the application writes data from the client device to the new server and, additionally, the application writes server migration status to the client device GUI and to the keychain (S710), algorithm 700 ends (S712). Returning to FIG. 4, after home network controller management application 434 writes user data from client device 308 to user data 456 in external server 122 and, additionally, home network controller management application 434 writes server migration status information to display 432 of client device 308 and to keychain 426 of memory 424 of client device 308, the algorithm ends. For example, returning to FIG. 8E, at time $t_{24}$, when the server migration is complete, the user would see a message like the one shown in FIG. 8E letting them know that the server migration is complete.

It should be noted that in the example embodiments discussed above, the GUI of the client device may be configured to generate a first user menu when the client device is associated with external server 120 and prior to completion of migration of the data, whereas the GUI of the client device may be configured to generate a second user menu after completion of migration to the external server 122. This may indicate to the user that not only is the client device associated with a new server, but the client device now has access to new features of the new server. However, it should also be noted that in some embodiments, the GUI of the client device may be configured to generate the same user menu when the client device is associated with external server 120 and prior to completion of migration of the data, as after completion of migration to the external server 122. This may provide a seamless transition to the new server without bothering the user to the specifics of the transition from external server 120 to external server 122.

Figure 9:
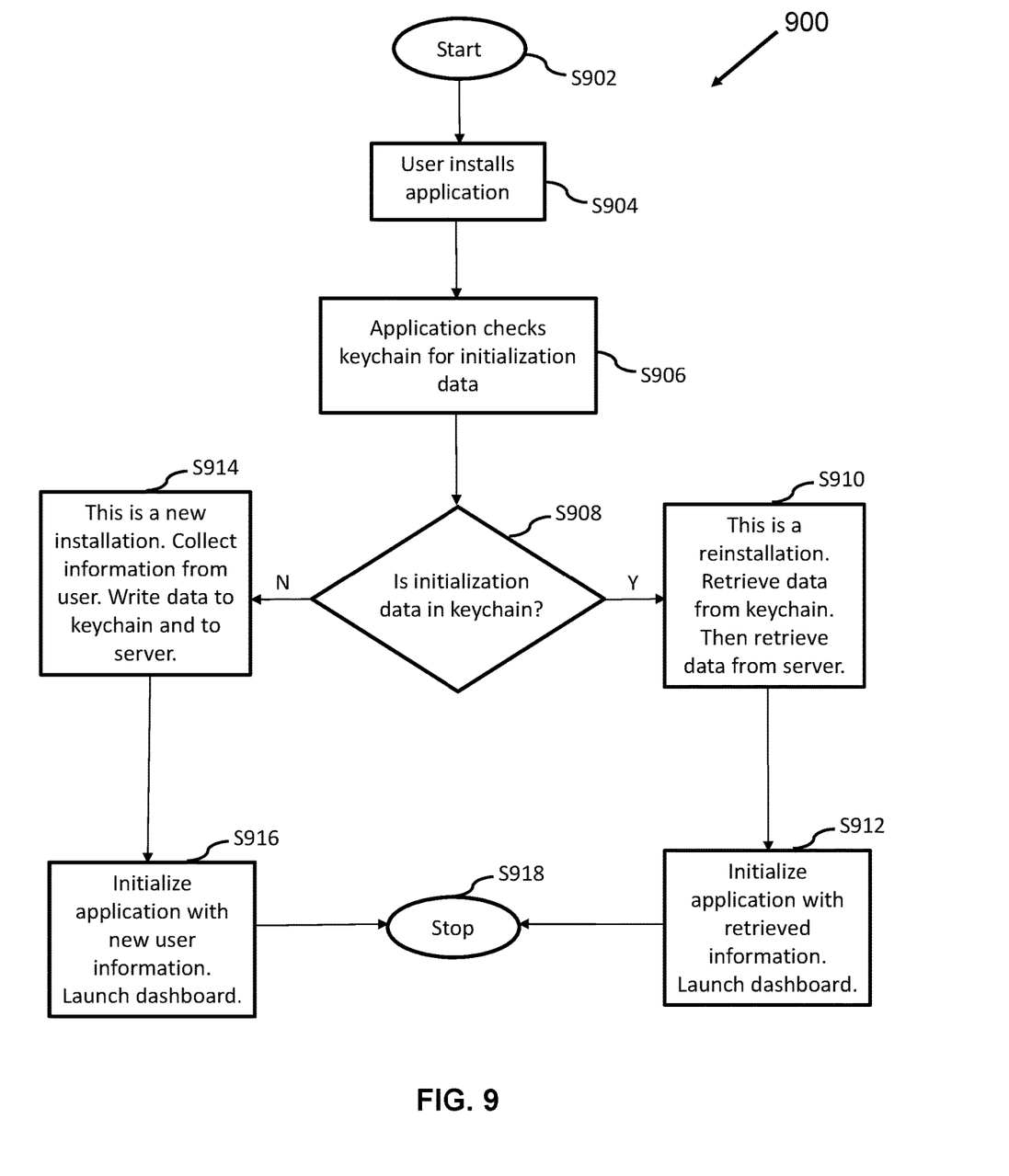
FIG. 9 illustrates an example algorithm in which a home network management controller application does not exist on a client device and is either installed for the first time or reinstalled using initialization information in the keychain memory in accordance with aspects of the present disclosure.

FIG. 9 illustrates an example algorithm 900 in which a home network management controller application does not exist on a client device and is either installed for the first time or reinstalled after being deleted using initialization information in the keychain of the client device in accordance with aspects of the present disclosure. This will now be described in more detail with reference to FIG. 4.

Returning to FIG. 9, algorithm 900 to be executed by a processor starts (S902), and the user installs an application (S904). For example, returning to FIG. 4, the user of client device 308 installs home network controller management application 434 in memory 424.

Returning to FIG. 9, after the user installs an application (S904), the application checks the keychain storage for initialization data (S906). For example, returning to FIG. 4, after the user of client device 308 installs home network controller management application 434 in memory 424, home network controller management application 434 checks keychain 426 for initialization data.

Returning to FIG. 9, after the application checks the keychain storage for initialization data (S906), the application determines if the initialization data is in the keychain storage (S908). For example, returning to FIG. 4, after home network controller management application 434 checks keychain 426 for initialization data, home network controller management application 434 determines if the initialization data is in keychain 426.

Returning to FIG. 9, if the application determines that the initialization data is not in the keychain storage (N at S908), the application determines that this is a new installation. Information is collected from the user and data is written to the keychain and to the server (S914). For example, returning to FIG. 4, if home network controller management application 434 determines that initialization data is not in keychain 426, the home network controller management application 434 determines that this is a new installation. Home network controller management application 434 collects user information from the user of client device 308 and writes initialization information to keychain 426 and user account information to external server 122.

Returning to FIG. 9, after the application determines that this is a new installation and information is collected from the user and data is written to the keychain and to the server (S914), the application is initialized with new user information and the application dashboard is launched (S916). For example, returning to FIG. 4, after home network controller management application 434 determines that this is a new installation, and after home network controller management application 434 collects user information from the user of client device 308 and writes initialization information to keychain 426 and user account information to external server 122, home network controller management application 434 is initialized with the new user information, and the dashboard for home network controller management application 434 is launched in client device 308.

Returning to FIG. 9, after the application is initialized with new user information and the application dashboard is launched (S916), algorithm 900 ends (S918). For example, returning to FIG. 4, after home network controller management application 434 is initialized with the new user information and the dashboard for home network controller management application 434 is launched in client device 308, the algorithm ends.

Returning to FIG. 9, if the application determines that the initialization data is in the keychain storage (Y at S908), the application determines that this is a reinstallation. Data is retrieved from the keychain and then data is retrieved from the server (S910). For example, returning to FIG. 4, if home network controller management application 434 determines that the initialization data is in keychain 426 (Y at S908), home network controller management application 434 determines that this is a reinstallation and user data is retrieved from keychain 426 and additional user data is retrieved from external server 122.

Returning to FIG. 9, after the application determines that this is a reinstallation and data is retrieved from the keychain and data is retrieved from the server (S910), the application is initialized with the retrieved information and the dashboard is launched (S912). For example, returning to FIG. 4, after home network controller management application 434 determines that this is a reinstallation and user data is retrieved from keychain 426 and additional user data is retrieved from external server 122, home network controller management application 434 is initialized with the retrieved information and the dashboard for the home network controller management application 434 is launched.

Returning to FIG. 9, after the application is initialized with the retrieved information and the dashboard is launched (S912), algorithm 900 ends (S918). For example, returning to FIG. 4, after home network controller management application 434 is initialized with the information retrieved from keychain 426 and external server 122 and the dashboard for the home network controller management application 434 is launched, the algorithm ends.

Home network controller management applications require the collection and storage of user data in order to be operational. When a home network controller management application is deleted and then reinstalled, if the user data required by the application was stored in the application's cache, the user data will no longer be available to the application. This would cause the user to have to reimport their user data and reinitialize their application, causing stress and confusion for the user.

A system and method in accordance with the present disclosure solves the problem of losing access to user data when a home network controller management application is reinstalled by storing application-specific initialization data within the keychain storage of an associated client device. The keychain storage is persistent and does not get deleted even if the application gets deleted. The present disclosure improves the customer experience because by using the keychain storage to store application-specific initialization data, if the home network controller management application is deleted and then reinstalled, the client device will be able to reinitialize the reinstalled application quickly with the user's data, thus making it easy for a user to begin using their application again.

The operations disclosed herein may constitute algorithms that can be effected by software, applications (apps, or mobile apps), or computer programs. The software, applications, computer programs can be stored on a non-transitory computer-readable medium for causing a computer, such as the one or more processors, to execute the operations described herein and shown in the drawing figures.

The foregoing description of various preferred embodiments have been presented for purposes of illustration and description. It is not intended to be exhaustive or to limit the present disclosure to the precise forms disclosed, and obviously many modifications and variations are possible in light of the above teaching. The example embodiments, as described above, were chosen and described in order to best explain the principles of the present disclosure and its practical application to thereby enable others skilled in the art to best utilize the present disclosure in various embodiments and with various modifications as are suited to the particular use contemplated. It is intended that the scope of the present disclosure be defined by the claims appended hereto.

What is claimed is:

1. A client device for use with a Wi-Fi network device, a first external server, and a second external server, said client device comprising:
    a memory having a non-critical portion configured to store non-critical data and a keychain storage portion configured to store encrypted data; and
    a processor configured to execute instructions stored on said memory to cause said client device to:
        wirelessly associate with the Wi-Fi network device;
        store Wi-Fi network device data associated with configuring the Wi-Fi network device in the first external server;
        migrate the Wi-Fi network device data from the first external server to the second external server via said client device;
        store migration status information in said keychain storage portion of said memory when the migration of the Wi-Fi network device data from the first external server to the second external server is complete; and
        wherein migration status information stored in said keychain storage portion of said memory is configured to persist through a life cycle of said client device.

2. The client device of claim 1, wherein said processor is configured to execute instructions stored on said memory to additionally cause said client device to store the Wi-Fi network device data via the Wi-Fi network device.

3. The client device of claim 1, wherein said processor is configured to execute instructions stored on said memory to additionally cause said client device to store intermediate migration status information in said keychain storage portion of said memory while migrating Wi-Fi network device data from the first external server to the second external server.

4. The client device of claim 1, further comprising a graphic user interface (GUI) configured to generate a first user menu prior to completion of migration of the data from the first external server to the second external server is complete and to generate a second user menu after completion of migration of the data from the first external server to the second external server is complete.

5. A method of using a client device with a Wi-Fi network device, a first external server, and a second external server, said method comprising:
    wirelessly associating, via a processor configured to execute instructions stored on a memory having a non-critical portion configured to store non-critical data and a keychain storage portion configured to store encrypted data;
    storing, via the processor, Wi-Fi network device data associated with configuring the Wi-Fi network device in the first external server;
    migrating, via the processor, the Wi-Fi network device data from the first external server to the second external server via the client device;
    storing, via the processor, migration status information in the keychain storage portion of the memory when the migration of the Wi-Fi network device data from the first external server to the second external server is complete; and
    wherein migration status information stored in the keychain storage portion of the memory is configured to persist through a life cycle of the client device.

6. The method of claim 5, wherein said storing the Wi-Fi network device data comprises storing the Wi-Fi network device data via the Wi-Fi network device.

7. The method of claim 5, further comprising storing, via the processor, intermediate migration status information in the keychain storage portion of the memory while migrating Wi-Fi network device data from the first external server to the second external server.

8. The method of claim 5, further comprising:
    generating, via a graphic user interface (GUI), a first user menu prior to completion of migration of the data from the first external server to the second external server is complete; and
    generating, via the GUI, a second user menu after completion of migration of the data from the first external server to the second external server is complete.

9. A non-transitory, computer-readable media having computer-readable instructions stored thereon, the computer-readable instructions being capable of being read by a client device for use with a Wi-Fi network device, a first external server, and a second external server, wherein the computer-readable instructions are capable of instructing the client device to perform the method comprising:
    wirelessly associating, via a processor configured to execute instructions stored on a memory having a non-critical portion configured to store non-critical data and a keychain storage portion configured to store encrypted data;
    storing, via the processor, Wi-Fi network device data associated with configuring the Wi-Fi network device in the first external server;
    migrating, via the processor, the Wi-Fi network device data from the first external server to the second external server via the client device;
    storing, via the processor, migration status information in the keychain storage portion of the memory when the migration of the Wi-Fi network device data from the first external server to the second external server is complete; and wherein migration status information stored in the keychain storage portion of the memory is configured to persist through a life cycle of the client device.

10. The non-transitory, computer-readable media of claim 9, wherein the computer-readable instructions are capable of instructing the client device to perform the method wherein said storing the Wi-Fi network device data comprises storing the Wi-Fi network device data via the Wi-Fi network device.

11. The non-transitory, computer-readable media of claim 9, wherein the computer-readable instructions are capable of instructing the client device to perform the method further comprising storing, via the processor, intermediate migration status information in the keychain storage portion of the memory while migrating Wi-Fi network device data from the first external server to the second external server.

12. The non-transitory, computer-readable media of claim 9, wherein the computer-readable instructions are capable of instructing the client device to perform the method further comprising:
   generating, via a graphic user interface (GUI), a first user menu prior to completion of migration of the data from the first external server to the second external server is complete; and
   generating, via the GUI, a second user menu after completion of migration of the data from the first external server to the second external server is complete.

* * * * *